June 28, 1932. C. N. MITCHELL 1,864,845
SHOCK ABSORBER
Filed Nov. 19, 1925 2 Sheets-Sheet 1

INVENTOR.
Courtney N. Mitchell
BY
ATTORNEYS.

June 28, 1932.  C. N. MITCHELL  1,864,845
SHOCK ABSORBER
Filed Nov. 19, 1925   2 Sheets-Sheet 2

INVENTOR.
Courtney N. Mitchell
BY
ATTORNEYS.

Patented June 28, 1932

1,864,845

UNITED STATES PATENT OFFICE

COURTNEY N. MITCHELL, OF CLEVELAND, OHIO

SHOCK ABSORBER

Application filed November 19, 1925. Serial No. 69,991.

The present invention, relating, as indicated, to shock absorbers, is more particularly directed to an improved construction of device for absorbing, or rather retarding, the relative movement between two elements, such for example, as an axle and frame of a motor driven vehicle. A further object of the invention is to provide a device of this character which will operate with less interference with the action of the vehicle springs than is the case with those now in common use, and which shall act during relative movement of the axle and frame in only one direction. A still further object of the invention is the provision of automatically operated means of this character in which the retarding force is largely produced by, and is proportioned to, the movement given to a mass or weight properly mounted and connected to the elements which produce the resistance or the retarding action.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

Figure 1:
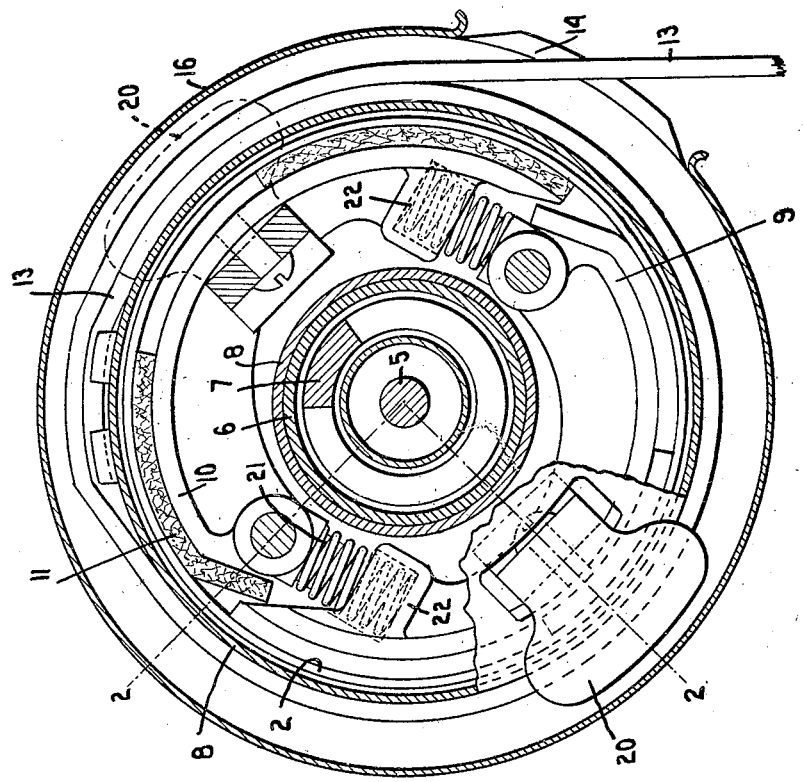
Figure 2:
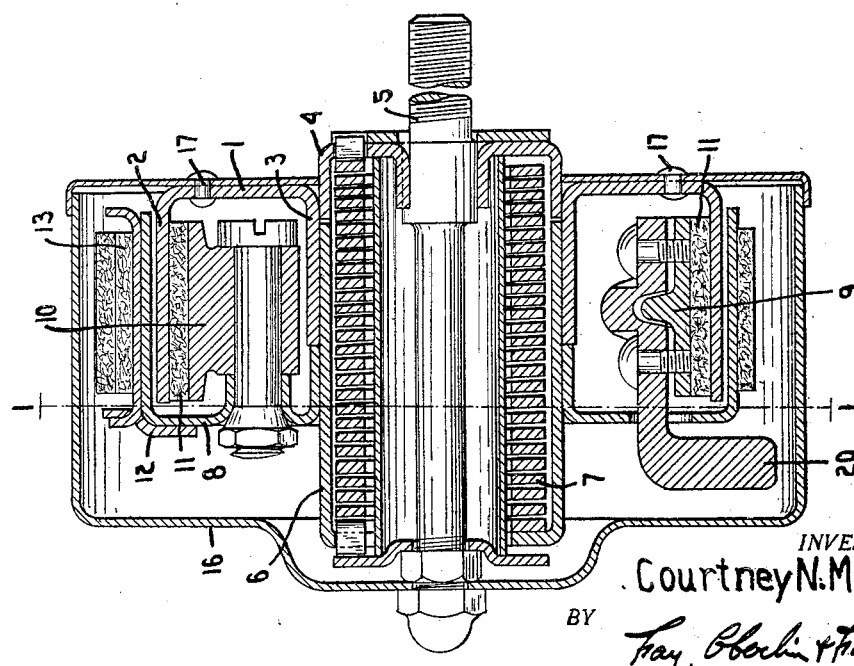
Figure 3:
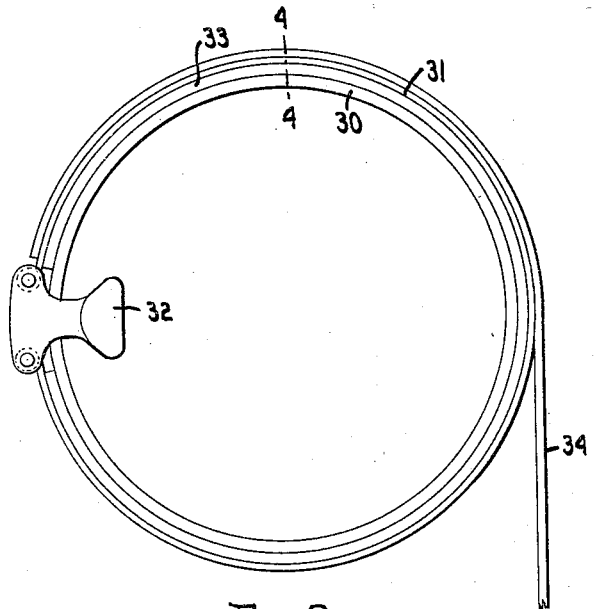
Figure 4:
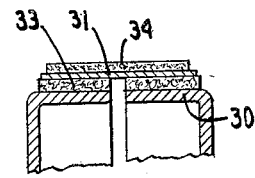
Figure 5:
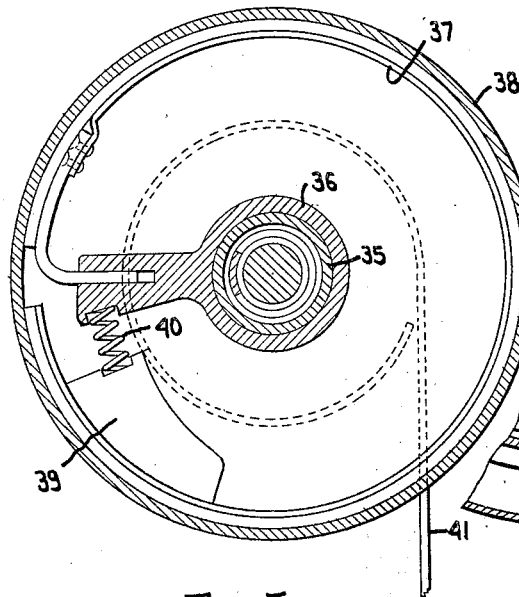
Figure 6:
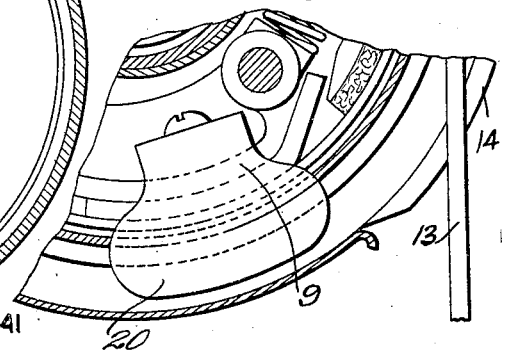

In said annexed drawings:

Fig. 1 is a vertical section through one form of my improved mechanism; Fig. 2 is a similar section taken at right angles to that of Fig. 1; Fig. 3 is a side elevation more or less diagrammatic in character illustrating the modification of the construction of Figs. 1 and 2; Fig. 4 is a section on the line 4—4, in Fig. 3; Fig. 5 is a view similar to Fig. 3 but showing still another modification of the present invention; and Fig. 6 is a fragmentary view similar to Fig. 1 illustrating a modification of the inertia weight mechanism.

It has been found that the riding comfort of a motor vehicle depends less upon the amplitudes of the vertical movements of the vehicle frame and body than upon the vertical accelerations during these movements. Vertical oscillations and consequent vertical acceleration of the same are always present when the vehicle is moving over any surface that is not absolutely smooth, and these movements and accelerations vary with the spacing of the irregularities in the road surface and with the spring suspension of the car.

It has been noticed that at two different car speeds the riding qualities of a car are usually particularly poor. The first condition occurs at relatively low speeds, and under this condition the vertical movement of the frame and body is large and has high accelerations. This condition is increased by the use of large low-pressure tires, such as are now being used on motor vehicles, and it is to overcome this condition that some type of retarding mechanism is essential.

The second speed at which the riding comfort is materially lessened is at a very much higher speed where the frame does not move through nearly as great a range as at the lower speed, but where the movement of the frame, while through a short distance, is effected with very high accelerations. The use of low pressure tires materially assists the riding qualities of cars under this condition, but it is also at this speed that the usual double acting shock absorber is of little advantage as it adds to the various forces which are producing the high vertical accelerations, and in some cases to such extent that it would merely offset the advantages which would otherwise be gained by the use of low pressure tires.

I have found that a single acting shock absorber not only adds nothing to the accelerating forces under this last-named condition, but does add considerably to the forces tending to retard the upward movement of the chassis after the upward displacement of the axle has increased the force of the chassis springs and will contribute materially to the riding qualities of any car, provided the force offered is proportional but opposite in directions to the vertical accelerating forces. My improved shock absorber is designed to control the vertical accelerations by modifying the static and dynamic friction between two relatively movable elements such as the brake drum and shoe in proportion to the resistance which is required. I accomplish this by taking advantage of the inertia effect of a weight introduced into the train of braking elements to be acted upon by the relative movement between the two braking elements and to increase the braking effort in direct proportion to the speed of acceleration produced by the movement of the frame of the vehicle.

Referring now to Figs. 1 and 2 the preferred form of my invention is shown to consist of a cylindrical drum 1 having concentric flanges 2 and 3, of which the inner flange 3 is secured to a hub member 4, which in turn is secured by means of a bolt 5 to either one of the two relatively movable elements whose action it is desired to control. Ordinarily this fixed drum element will be secured to the frame of the vehicle. Freely rotatable within the flange 3 of the fixed drum is a cylindrical member 6, to one end of which is secured a coil spring 7, the other end of the spring being secured to the member 4. This spring is thus wound and compressed upon any initial relative rotational movement between the rotating drum 6 and the fixed flange 3. Secured about the cylinder 6 is a circular member 8, to which are pivotally secured two shoes 9 and 10, each of which is provided on its outer surface with a frictional facing band 11 of suitable material, this band being aligned adjacent to the inner surface of the fixed drum 2 and acting thereagainst during the operation of the device, which will presently be described.

Secured to the member 8 is a small bracket 12, to which is secured a clip attached to a strap 13, which may be passed one or more times around this element and then extended toward the other of the two relatively movable elements, usually the axle of the vehicle, through an opening 14 in a casing 16 which encloses the entire mechanism and is secured in position by attachment at the point 17 to the fixed band 2 and upon its other side to the bolt 5.

Secured intermediate the ends of each of the two shoes 9 and 10 are weights 20. The shoes are maintained in contact with the fixed drum 2 by means of coil springs 21 acting between the bosses, in which are the axes of the two shoes and suitable formed sockets 22 formed on the inner surface of the shoes 9 and 10.

The action of my retarding mechanism is as follows: Assuming that the axle has been displaced away from the frame, thus pulling the strap 13 and rotating the movable drum 8, the shoes 9 and 10 are also rotated in a clockwise direction, viewing the same as in Fig. 1. This movement of the shoes 9 and 10 causes these shoes to be pressed outwardly and into a retarding engagement with the fixed drum 2 by an amount which is proportioned to the acceleration of movement of the axle, the distance through which it is displaced, the weight of the elements 20 and a certain other constant factor dependent upon the initial pressure of the shoes against the fixed drum. During the movement of the axle toward the frame the shoes are pulled freely over the surface of the fixed drum, that is, there is relatively little, if any, resistance to this return movement, thus giving the ideal condition obtainable in a shock absorber intended to be used in motor vehicles. The condition just mentioned is well recognized in the art of shock absorbers to be the best obtainable, in that it in no way interferes with the purpose or operation of the vehicle springs in permitting the axle to move toward the frame as when the vehicle wheel encounters a rise in the road. During this movement it is quite essential that the shock absorber does not materially prevent freedom in the movement of the axle toward the frame. Otherwise the effect of the springs would be lost. In addition to this, the effect of the spring 7 is to merely give up whatever force has been stored up in it during the initial movement so that the action of this spring, while returning the parts to their initial position does not enter into the retarding action, which is solely controlled by the inertia of the weighted elements 20. This result is not apparent at once but upon a careful analysis and after exhaustive tests I have found that there is no retarding on the return of the brake shoes to their normal position. The primary reason for this is that the pivot of the shoe 10, for instance, is mounted eccentrically to the major axis 5. Upon movement in the clockwise direction with respect to Fig. 1 the force acting on the weight 20 moves in a straight line from the center of the eccentric pivot to the center of the weight 20. It will be readily appreciated that this produces a braking action moving the shoe closer to the fixed drum 8. Now upon a returning movement which is caused by the spring 7 the force acts along the same straight line but in a reverse direction, therefore, it moves from the center of the weight 20 to the center of the eccentric pivot. This in turn will tend to move the shoe 10 away from the fixed drum 8 and consequently does not retard of itself, the only retarding action being that occasioned by the springs 21. Of course there will be some centrifugal action but since the brake drum only makes one revolution the inertia action is more than sufficient to overcome what little centrifugal force has been generated.

It will be noted that in Fig. 1 of the drawings I have shown in full lines the weight member 20 as being disposed nearly central of the brake shoes. The position of this weight may however be changed to meet varying conditions; i. e. if an increase in the inert force thereof is required the weight may be moved closer to the fulcrum stud of the shoe. This is illustrated in the modification found in Fig. 6.

In Figs. 3 and 4 I have shown a modification of the above construction, in which there is a fixed drum 30 and a brake band 31 having its ends connected to a weighted element 32. This band is faced on its inner surface with frictional material 33 engaging against the outer surface of the fixed drum and is also secured to a strap 34, the strap being secured to the axle and the fixed drum being mounted on the frame of the vehicle. Upon sudden rotation of the brake band 31 the ends of the band are caused to move toward each other on account of the inert action of the weight 32 causing the aforesaid tightening of the band 31 on the fixed drum, increasing the braking pressure between that drum and the moving friction material on the brake band by an amount which is dependent upon the mass of the weight in the member 32 and the distance through which this weight acts, as well as on the other factors already referred to. Upon the return movement there is substantially no resistance to movement as is the case with the first form already described.

In Fig. 5 I have shown another construction, in which a fixed hub 35 is secured to the frame of the vehicle, about which is mounted a rotatable hub 36 to which is secured a circular strap or band 37 faced on its outer side with friction material and engaging against the inner surface of a fixed drum 38. The free end of the band 37 carries a weight 39 and the band is normally maintained in engagement with the fixed drum by means of a spring 40. Upon rotation of the rotatable hub in a clockwise direction with respect to the drawings by means of a strap 41, leading to the axle of the vehicle, the band 37 is caused to expand and increase the pressure and the braking effect upon further rotation of the hub by an amount which depends upon the mass of the weight 39 and the other factors already referred to.

From the foregoing it will be apparent that the main function of the weights is to produce an outward thrust to the brake shoes and this thrust is proportionate depending upon the accelerations in the shoes themselves. There is, however, a certain amount of radial pressure produced by the centrifugal force incident to the rotation of the shoes. This latter force is a course varied depending upon the speed of the accelerations imparted to the shoes and does not come into effective play until the rotation of the shoe has reached a certain speed. Actually, the inertia weights serve to instantaneously exert an outward pressure on the shoes at the start of their movement, and as the speed increases such pressure is maintained by the radial force due to the centrifugal action of such weights.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A vehicle shock absorber comprising a drum carried by the vehicle frame, a co-operating brake shoe, means connecting said shoe to the vehicle axle whereby movement thereof will effect rotation of said shoe, and means associated with said shoe to cause the same to be thrown by its inertia due to the rotation of the shoe into contact with the drum during the initial movement of said axle in one direction.

2. A vehicle shock absorber comprising a drum carried by the vehicle frame, a rotatable member actuated by movement of the vehicle axle, a braking member attached to said rotatable member and co-operating with said drum to offer resistance to the movement of said axle in one direction, and means carried by said braking member adapted to be actuated from the inertia thereof during the start of rotation of said rotatable member to force said braking member into engagement with said drum.

3. The combination of a brake drum providing an annular friction surface, a flexible metallic shoe mounted interiorly of said drum, friction material attached to said shoe adapted to co-operate with said drum annular surface to offer resistance to the movement thereof in one direction, means engaging one end of said shoe to rotate the same, and means attached to the other end of the shoe adapted to operate from the inertia thereof to force said latter end into engagement with the drum.

4. The combination of a supporting element adapted for attachment to a vehicle, a rotatable element mounted concentrically of said supporting element, complementary braking surfaces on said elements, means connecting said rotatable element to the vehicle axle, and means attached to said rotatable element operable from the inertia thereof at the initial movement of the rotatable element to force the same toward said fixed element.

5. In a shock absorber, the combination of a fixed element having an interior cylindrical braking surface, a rotatable element mounted about an axis spaced but parallel to said fixed element axis, a friction surface on said rotatable element adapted to engage said cylindrical braking surface, means for mounting said rotatable element axis and for moving the same concentrically of said fixed element axis, and means operable by its inertia to move said rotatable element toward said cylindrical braking surface.

6. In a shock absorber, a stationary element having a friction surface, a movable element contacting with said friction surface, and an inertia element connected to said movable element adapted to regulate the pressure between said friction surface and said movable element in proportion to the acceleration of said inertia element.

7. A vehicle shock absorber comprising a fixed channel shaped drum, brake shoes mounted on a movable drum, said shoes having inertia elements thereon to cause them to engage the fixed drum upon initial movement of said movable drum, said drums being interfitting, a spring connecting said drum, and a strap connecting said movable drum with the axle of said vehicle.

Signed by me, this 14th day of November, 1925.

COURTNEY N. MITCHELL.